US010781877B2

(12) United States Patent
Humble et al.

(10) Patent No.: US 10,781,877 B2
(45) Date of Patent: Sep. 22, 2020

(54) HUB FOR MOUNTING A BRAKE DISC TO A VEHICLE AXIS

(71) Applicant: ALCON COMPONENTS LIMITED, Staffordshire (GB)

(72) Inventors: Richard Humble, Staffordshire (GB); Andrew Smith, Staffordshire (GB); Garry Wiseman, Staffordshire (GB)

(73) Assignee: ALCON COMPONENTS LIMITED, Tamworth (GB)

(*) Notice: Subject to any disclaimer, the term of this patent is extended or adjusted under 35 U.S.C. 154(b) by 0 days.

(21) Appl. No.: 16/081,106

(22) PCT Filed: Mar. 24, 2017

(86) PCT No.: PCT/GB2017/050849
§ 371 (c)(1),
(2) Date: Aug. 30, 2018

(87) PCT Pub. No.: WO2017/168132
PCT Pub. Date: Oct. 5, 2017

(65) Prior Publication Data
US 2019/0078633 A1    Mar. 14, 2019

(30) Foreign Application Priority Data
Mar. 26, 2016  (GB) .................. 1605146.8

(51) Int. Cl.
*F16D 65/12* (2006.01)
*F16D 55/00* (2006.01)
*F16D 65/02* (2006.01)

(52) U.S. Cl.
CPC .......... *F16D 65/123* (2013.01); *F16D 55/00* (2013.01); *F16D 2055/0008* (2013.01); *F16D 2065/1316* (2013.01); *F16D 2065/1384* (2013.01)

(58) Field of Classification Search
CPC .............. F16D 65/123; F16D 55/00; F16D 2065/1316; F16D 2055/0008
See application file for complete search history.

(56) References Cited

U.S. PATENT DOCUMENTS

2004/0207249 A1   10/2004  Baumgartner
2005/0126870 A1*  6/2005  Doppling ................ F16D 65/12
                                                        188/218 XL
(Continued)

FOREIGN PATENT DOCUMENTS

DE          10334555       2/2005
DE        102005060440     4/2007
(Continued)

OTHER PUBLICATIONS

Search Report and Opinion issued in App. No. GB1605146.8 (dated 2017).
(Continued)

*Primary Examiner* — Vishal R Sahni
(74) *Attorney, Agent, or Firm* — Barnes & Thornburg LLP (57) ABSTRACT

The present invention relates to a hub for mounting a brake disc to a flange member on a vehicle axis. The hub member comprises a flange section with a plurality of first openings adapted to receive mounting members for mounting the flange section to a flange member and a brake disc attachment section connected to the flange section. The brake disc attachment section circumferentially surrounding the flange section and comprises a plurality of second openings adapted to receive mounting members for mounting the attachment section to a brake disc. The attachment section further comprises at least one reinforcement rib connected to at least one of the plurality of second openings.

19 Claims, 12 Drawing Sheets

(56) References Cited

U.S. PATENT DOCUMENTS

| | | | | |
|---|---|---|---|---|
| 2012/0247883 A1* | 10/2012 | Root | ................... | B60B 27/0052 |
| | | | | 188/18 A |
| 2013/0032440 A1* | 2/2013 | Karl | ........................ | F16D 65/12 |
| | | | | 188/218 XL |
| 2014/0224603 A1* | 8/2014 | Kokott | .................. | F16D 65/123 |
| | | | | 188/218 XL |

FOREIGN PATENT DOCUMENTS

| | | |
|---|---|---|
| DE | 202015105540 U | 10/2015 |
| EP | 1086829 | 3/2001 |
| GB | 2540631 | 1/2017 |
| KR | 2015/0049968 | 5/2015 |
| WO | WO 02/087901 | 11/2002 |

OTHER PUBLICATIONS

Int'l Search Report and Written Opinion in issued in App. No. PCT/GB2017/050849 (dated 2017).

\* cited by examiner

HUB FOR MOUNTING A BRAKE DISC TO A VEHICLE AXIS

CROSS REFERENCE TO RELATED APPLICATIONS

This application is a U.S. nationalization under 35 U.S.C. § 371 of International Application No. PCT/GB2017/050849, filed 24 Mar. 2017, which claims priority to United Kingdom Patent Application No. 1605146.8, filed 26 Mar. 2016. The disclosures set forth in the referenced applications are incorporated herein by reference in their entireties.

The present invention relates to a hub for mounting a brake disc to a flange member on a vehicle axis. In particular, the invention relates to mounting hubs for high performance vehicles, such as racing cars.

As is known to those familiar with disc brakes for high performance vehicles, the brake disc is frequently mounted on a vehicle axis by means of a mounting hub. The mounting hub, also known as a mounting "bell", is releasably attachable to the brake disc to connect the latter with a flange member on a vehicle axis. To this end it is known to screw the mounting hub to a mounting side of the brake disc via a plurality of fixed or floating screws.

During use, when the brake pads of a brake caliper are applied to the brake disc, the brake disc will be decelerated relative to the vehicle axis and hence introduce a braking load opposite to the travel direction of the vehicle axis. The load introduced by the brake disc is transferred to the vehicle axis via the aforesaid attachment screws of the mounting hub. It is a known problem that braking loads transferred from the brake disc to the mounting hub via the screws are higher in areas close to the brake caliper and negligible at the opposite end of the mounting hub. These uneven braking loads not only result in higher wear of the brake system but also introduce vibrations that can reduce braking efficiency of the brake caliper.

In view of the aforementioned problem, it is an object of the present invention to provide a new hub for mounting a brake disc to a flange member on a vehicle axis, which exhibits improved braking load distribution. It is a further object of the present invention to provide an improved mounting hub that provides improved strength at a lower overall weight.

According to a first embodiment, the present invention relates to a hub for mounting a brake disc to a flange member on a vehicle axis, the hub member comprising a flange section with a plurality of first openings adapted to receive mounting members for mounting the flange section to said flange member. The hub further comprises a brake disc attachment section connected to the flange section, said brake disc attachment section circumferentially surrounding the flange section and comprising a plurality of second openings arranged along an outside circumference of the attachment section. The plurality of second openings are adapted to receive mounting members for mounting the attachment section to a brake disc, wherein the attachment section comprises at least one reinforcement rib connected to at least one of the plurality of second openings.

In contrast to conventionally known mounting hubs, the attachment section of the present invention comprises at least one reinforcement rib connected to at least one of the plurality of second openings. The reinforcement rib absorbs braking loads from the edge of its respective second opening and distributes the loads across the entire mounting hub. Accordingly, load peaks at the brake caliper will be avoided, resulting in a longer service life of the present mounting hub. The reduced load gradient across the mounting hub further provides for improved stability of the attachment between the brake disc and the mounting hub.

In another embodiment, the reinforcement rib extends between an inside circumference and the outside circumference of the attachment section. In other words, the reinforcement rib directs braking loads away from the second opening towards the flange section of the mounting hub. The reinforcement rib may connect the second opening to the outer circumference of the flange section.

In a further embodiment, the attachment section comprises at least one reinforcement rib for each of the second openings. In other words, at least one reinforcement rib is connected every single one of the second openings. Consequently, every second opening may be connected to the flange section via their respective reinforcement rib, resulting in a homogenous load distribution at any stage of the braking process. Depending on the load magnitude, it is equally feasible to only support every second, third or fourth second opening with a reinforcement rib.

According to another embodiment, each of the reinforcement ribs is connected to one of the plurality of second openings. To further improve load distribution of the mounting hub, the reinforcement ribs may be directly attached to the load bearing surface of the second openings, as will be described in more detail below.

In another embodiment, the attachment section comprises a mounting side surface for contacting a brake disc, in use, and a non-mounting side surface opposite the mounting site surface, wherein the reinforcement rib is arranged on the mounting side surface of the attachment section. Alternatively, the reinforcement rib may only be arranged on the non-mounting side surface of the attachment section. It is also feasible to arrange at least one reinforcement rib on either side surface of the attachment section.

It should be noted that the mounting hub of the present invention is of course adapted to have two mounting surfaces, namely the surface that contacts the brake disc, in use, and the surface of the flange section that contacts a flange member of the vehicle axis, in use. However, for simplicity, the term "mounting side surface" in the present disclosure only refers to the surface that contacts the brake disc, in use. The opposite surface of the mounting hub, i.e. the surface that does not contact the brake disc but the flange member of the vehicle axis, is described herein below as the "non-mounting side surface".

According to another embodiment, the at least one mounting side reinforcement rib of the attachment section comprises a substantially straight profile. Alternatively or additionally, the at least one non-mounting side reinforcement rib of the attachment section may comprise a substantially curved profile.

When arranging reinforcement ribs on both the mounting side and non-mounting side of the attachment section, the at least one reinforcement rib on the mounting side may extend in different directions to the at least one non-mounting side reinforcement rib, when viewed in plan. According to this arrangement, one of the mounting side and non-mounting side reinforcement ribs will act as a buffer for compressive loads, while the oppositely orientated reinforcement rib(s) will resist tensioning forces caused by the braking loads. This particular asymmetrical arrangement has been found to be extremely durable and will reduce vibrations within the brake disc significantly.

According to another aspect, the at least one reinforcement rib arranged on the mounting side of the attachment section is offset in relation to the at least one non-mounting side reinforcement rib, when viewed in plan. By offsetting the mounting side and non-mounting side reinforcement ribs, the braking loads can be distributed more evenly along the inner circumference of the attachment section.

In another embodiment, each of the reinforcement ribs may be inclined relative to a radial direction of the attachment section. An incline of the reinforcement ribs in relation to the radial direction advantageously enables the reinforcement ribs to absorb the braking loads along the load bearing side surface of the second openings even if the reinforcement ribs are constructed as thin thickening portions. This may equally apply for reinforcement ribs with a curve and/or straight profile. In particular, the reinforcement ribs on the mounting and/or non-mounting side surface of the attachment section may be inclined at an acute angle relative to the radial direction of the hub.

The reinforcement ribs may be constructed as portions of the attachment section with increased thickness, compared to the remaining parts of said attachment section. The thickness of the reinforcement ribs may vary with the magnitude of the braking loads expected when using the mounting hub of the present invention. As such, brake systems for race cars may have significantly thicker reinforcement ribs than mounting hubs of road vehicles. It is also feasible to vary the width of the reinforcement ribs depending on the expected braking loads.

In another embodiment, the plurality of second openings are slots extending radially inwards from the outside circumference of the attachment section. According to this embodiment, the slots may allow for radial flow of the mounting screws, which can compensate differential expansion of the brake disc and mounting hub, thus reducing stresses in the brake disc and preventing cracking and distortion. However, the plurality of second openings could equally be constructed as holes adapted to retain the mounting members in a non-floating manner. That is, the mounting members are not able to move along a plane of the attachment section. In this alternative embodiment, the brake disc may comprise slotted openings, in which the mounting members can act and float during use.

According to another aspect, each of the second openings comprises a first side surface and a second side surface opposite the first side surface, wherein the first side surface is a load bearing surface adapted to bear a braking load introduced by the second mounting members, when in use, and wherein each reinforcement member is directly connected to the first side surface of a respective slot. "Directly connected" in this context means that the reinforcement members form an integral part with at least the first side surface of their respective second opening. It was found that most of the braking loads are introduced into the mounting hub along one of the slot side surfaces, while the opposite side surface of the slots remains almost load free. Consequently, the reinforcement members do not necessarily need to extend around the entire second opening but may only support the load bearing, first side surface of the slot. This particular arrangement of the reinforcement ribs on only one side of the slots reduces the weight of the hub while providing substantially the same stiffness.

In another embodiment, the adjacent reinforcement ribs define valleys of reduced thickness therebetween. As mentioned previously, the reinforcement ribs may be constructed as portions of increased thickness, which may extend between the inner circumference and the outer circumference of the attachment section. As such, the reinforcement ribs can be defined as peaks on the mounting or non-mounting side surface of the attachment section, wherein the peaks are connected to each other by valleys of reduced thickness. The valleys of reduced thickness may also be considered as a web extending between the ribs. In order to further reduce the weight of the present mounting hub, the valleys or web portions between the ribs may comprise one or more openings, preferably in areas of particularly low load.

In another embodiment, the first side surface of each second opening is connected to the second side surface of an adjacent opening by means of a web portion. In other words, the side surfaces of the second openings may be constructed thicker than the connecting material between the second openings. Accordingly, the side surfaces of adjacent second openings are connected by I-beam formations, as will be described in more detail below. The use of web portions or I-beam formations further reduces the weight of the mounting hub.

The flange section of the present mounting hub may have a substantially circular shape, wherein the brake disc attachment section may comprise an annular shape, surrounding the substantially circular flange section. In order to further improve the even distribution of the braking loads, the plurality of second openings may be equi-angularly spaced along the outer circumference of the annular brake disc attachment section.

Embodiments of the present invention will now be described, by way of example only, with reference to the accompanying figures, in which:

FIG. 1b shows a bottom view of the mounting hub according to a first embodiment shown in FIG. 1a;

FIG. 1c shows a side view of the first embodiment of the mounting hub shown in FIG. 1a;

FIG. 1d shows an enlarged view of the left part shown in FIG. 1a;

FIG. 2b shows a bottom view of the mounting hub according to a second embodiment shown in FIG. 2a;

FIG. 2c shows a side view of the second embodiment of the mounting hub shown in FIG. 2a;

FIG. 2d shows an enlarged view of the left part shown in FIG. 2a;

FIG. 3b shows a bottom view of the mounting hub according to a third embodiment shown in FIG. 3a;

FIG. 3c shows a side view of the third embodiment of the mounting hub shown in FIG. 3a;

FIG. 3d shows an enlarged view of the left part shown in FIG. 3a; and

Figure 1A:
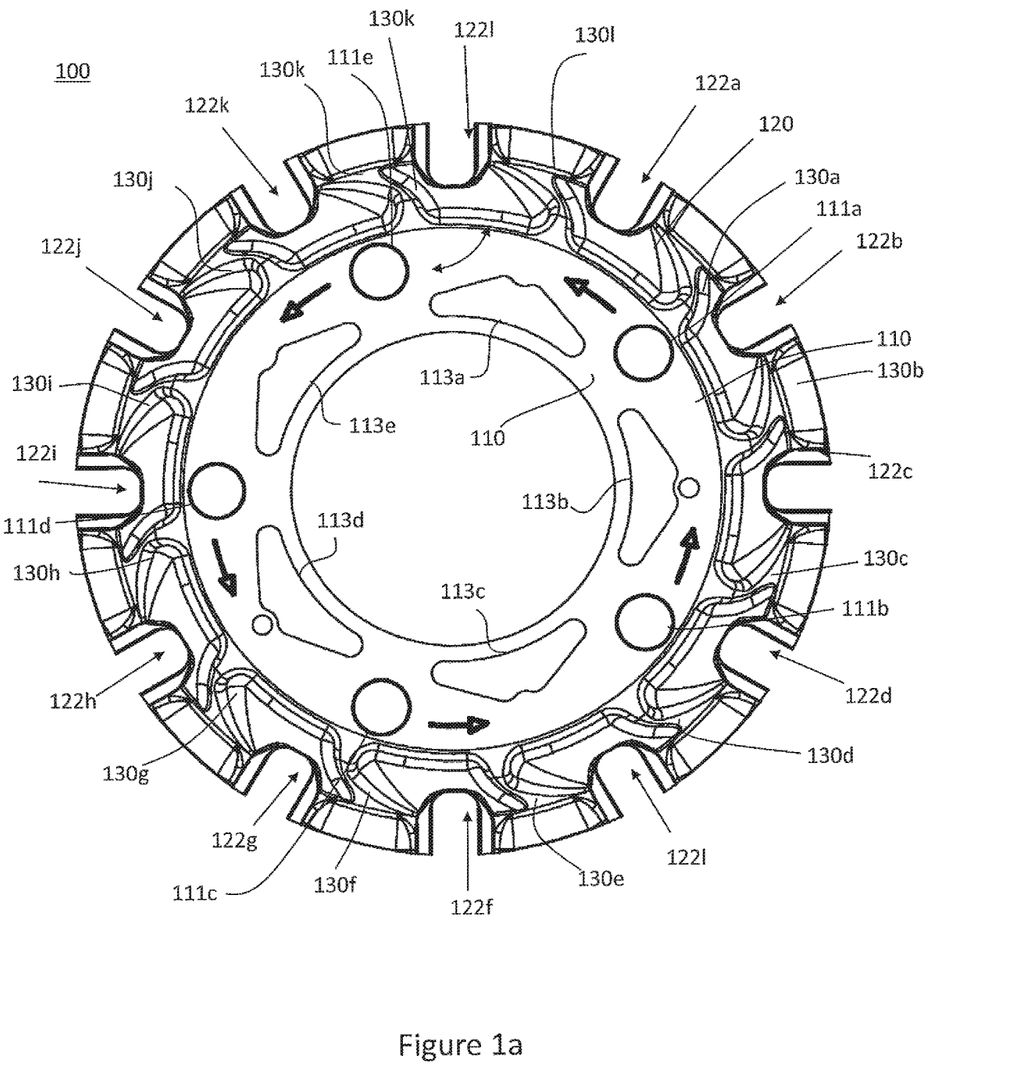
FIG. 1a shows a plan view of a mounting hub according to a first embodiment of the present invention.

A first embodiment of a mounting hub according to the present invention is shown in FIG. 1a, which shows a plan view of the non-mounting side. The mounting hub 100 comprises a substantially circular flange section 110 comprising a plurality of first openings 111a, 111b, 111c, 111d, and 111e. While FIG. 1a shows a total of five first openings 111a to 111e, the skilled person would understand that this number may vary depending on size and load considerations. The plurality of first openings 111a to 111e are adapted to receive mounting members, such as mounting screws for mounting the flange section 110 to a flange member (not shown) of a corresponding vehicle axis.

As shown, intermediate openings 113a, 113b, 113c, 113d, 113e are arranged between adjacent first openings 111a to 111e. The intermediate openings 113a to 113e exhibit a generally trapeze-shaped profile and further reduce the weight of the hub while maintaining sufficient stability. It should be noted that the trapeze-shaped intermediate openings 113a to 113e are optional openings and may be omitted, particularly for road vehicles, where weight considerations are not as essential.

Figure 1B:
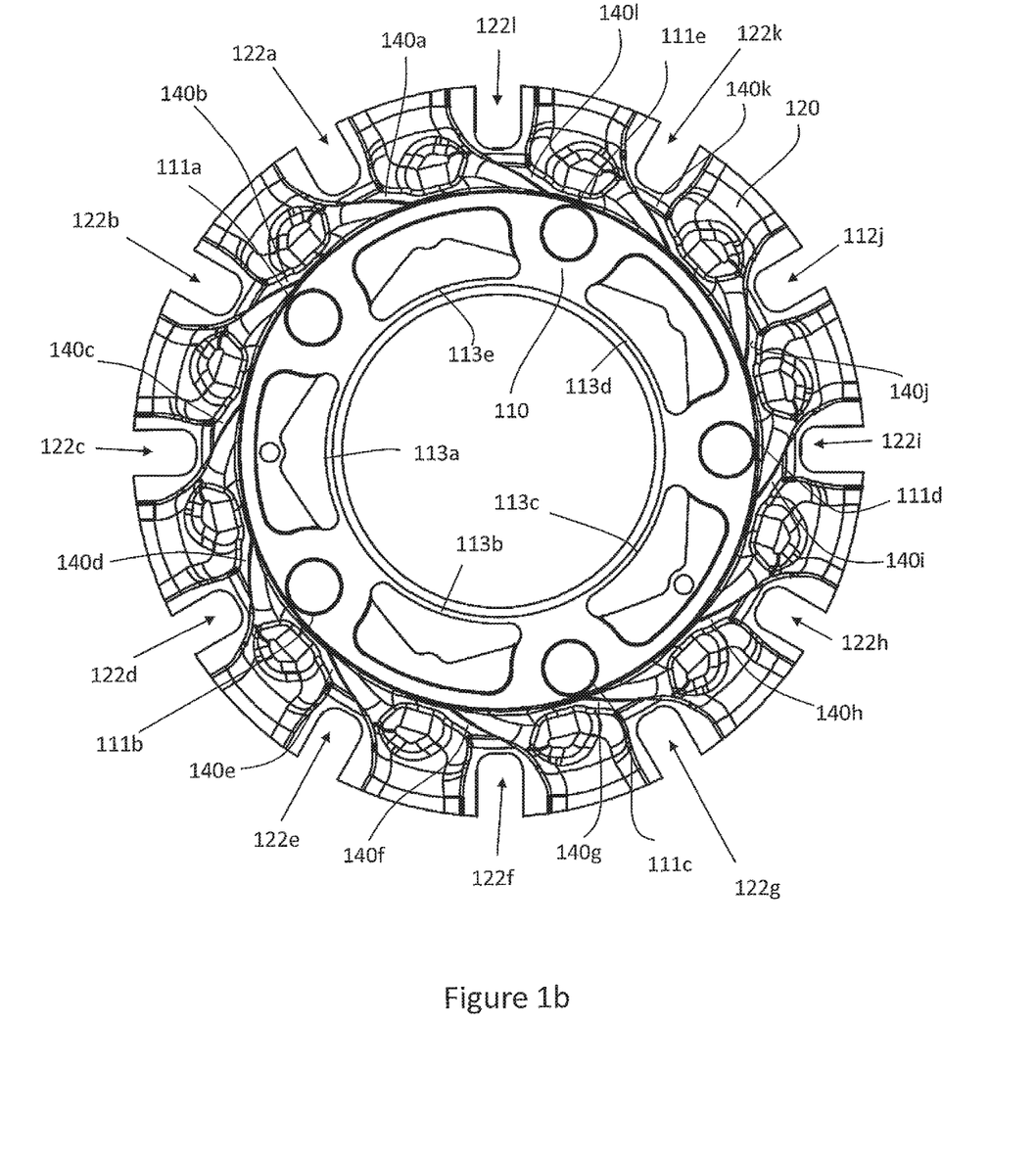
Figure 1C:
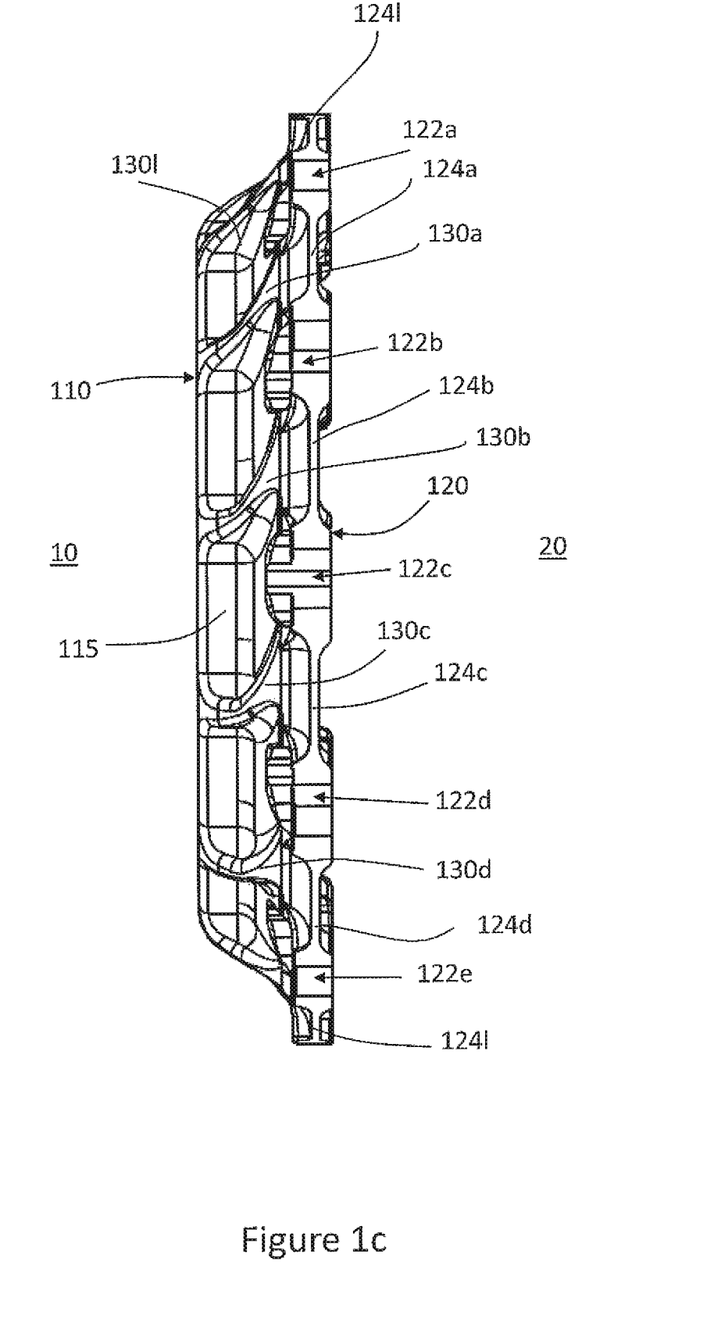

As illustrated in FIG. 1c, the flange section 110 is connected to a brake disc attachment section 120 via a transition portion 115. The transitioning portion 115 is illustrated as a shoulder portion, which extends perpendicular to the flange section 110 and the brake disc attachment section 120. The brake disc attachment section 120 of the first embodiment is an annular ring surrounding the flange section 110 circumferentially. The annular attachment section 120 comprises a plurality of second openings 122a, 122b, 122c, 122d, 122e, 122f, 122g, 122h, 122i, 122j, 122k and 122l. The plurality of second openings 122a to 122l are adapted to receive second mounting members, such as mounting screws, for mounting the attachment section 120 to a brake disc (not shown). Similar to the first openings 111a to 111e, the number of second openings 122a to 122l is dependent on the load requirements of the mounting hub and may substantially differ from the total number of twelve shown in FIG. 1a.

Figure 1D:
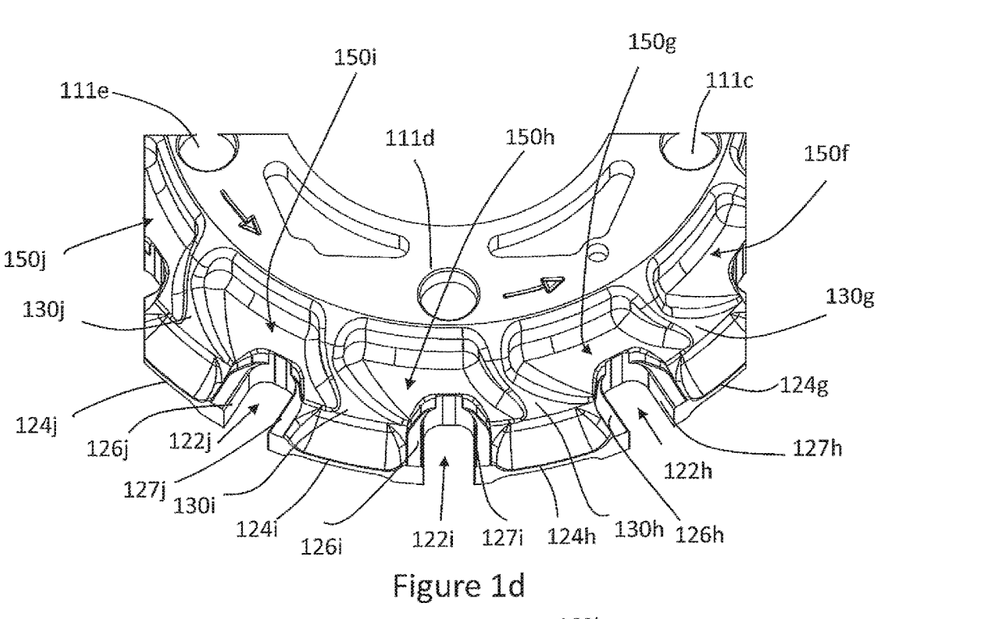
Figure 1E:
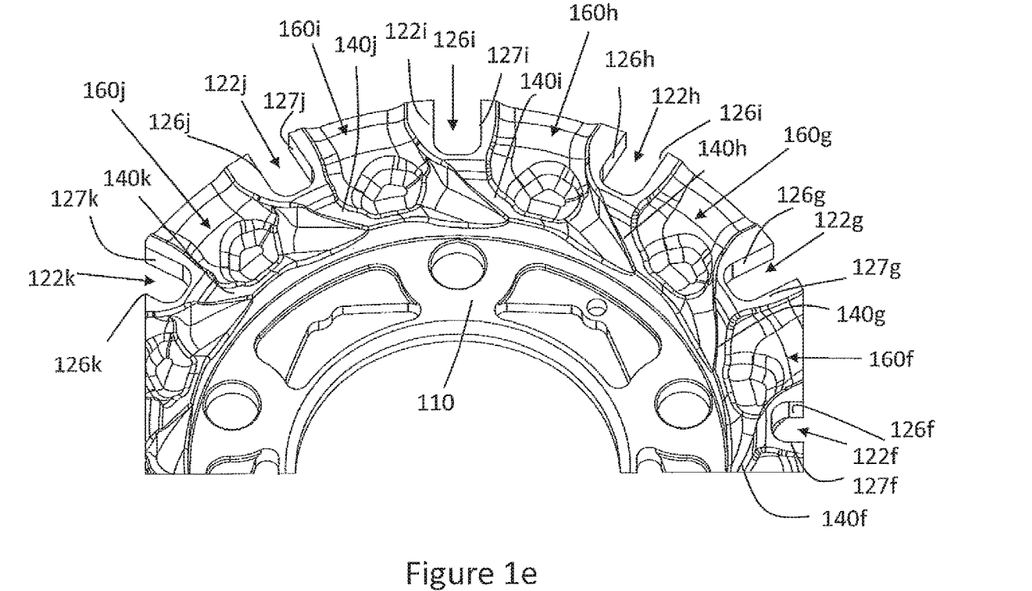
FIG. 1e shows an enlarged perspective view of the right part shown in FIG. 1b.

The second openings 122a to 122l are slots extending radially from the outside circumference of the annular attachment section 120. As depicted in FIGS. 1d and 1e, each of the slots 122a to 122l exhibits a first side surface 126f, 126g, 126h, 126i, 126j, 126k and an opposite second side surface 127f, 127g, 127h, 127i, 127j, and 127k. FIGS. 1a and 1d show arrows indicating the direction of rotation caused by the vehicle axis in use. The mounting hub 100 of the first embodiment shown in FIGS. 1a to 1e is therefore adapted to be driven in an anti-clockwise direction in FIGS. 1a and 1d. Accordingly, during acceleration and normal driving, the mounting hub 120 will transfer rotational movement from the vehicle axis to the brake disc in an anti-clockwise direction. Therefore, minor loads will act on the first side surface 126f to 126k of the second openings 122f to 122k depending on the inertia of the brake discs. During normal driving conditions, the brake disc rotates together with the mounting hub 100 in an anti-clockwise direction with negligible resistance. In a braking event, the brake caliper (not shown) slows down the movement of the brake disc compared to the mounting hub 100, resulting in braking loads, which are transferred to the mounting hub 100 via the mounting screws received within the second openings 122a to 122l. The braking load transferred by the mounting screws acts in a clockwise direction in FIGS. 1a and 1d, and thus applies force to the first side surfaces 126f, 126g, 126h, 126i, 126j, 126k of the respective second openings 122f to 122k. The braking loads so introduced into the first side surfaces 126f to 126k of the second openings 122f to 122k will be absorbed by their respective reinforcement ribs 130f, 130k and 140f, 140k respectively.

In detail, the mounting hub 100 of the first embodiment shown in FIGS. 1a to 1e comprises two kinds of reinforcement ribs 130a to 130f and 140a to 140f. While a first kind of reinforcement ribs 130a to 130l is arranged on the non-mounting side of the hub 100, a second kind of reinforcement ribs 140a to 140l is arranged on the mounting side surface of the hub 100. In the present disclosure, the mounting side 20, shown in FIG. 1c, is adapted to be connected to the brake disc in a flanging manner. The non-mounting side 10 of the hub 100, shown in FIGS. 1c and 1a, on the other hand, is adapted to be connected to a flange member on a vehicle axis (not shown).

FIGS. 1a and 1d show that the reinforcement ribs 130a to 130l on the non-mounting side surface of the mounting hub 100 are arranged between adjacent second openings 122a to 122l. In more detail, each of the reinforcement ribs 130a to 130l extends from the inner circumference of the annular attachment section 120 to one of the second openings 122a to 122l. To this end, the non-mounting side reinforcement ribs 130a to 130l extend in a curved manner from the inner circumference of the attachment section 130 to the first side surface 126f to 126k of its respective second opening 122a to 122l. In other words, each of the first reinforcement ribs is slightly offset in a circumferential direction relative to its second opening 122a to 122l and extends from the inner circumference of the attachment section 120 to the first side section of the respective opening 122a to 122l in a curved manner. As such, the first reinforcement ribs 130a to 130l extend in a substantially opposite direction to the clockwise braking loads. That is, the first reinforcement ribs 130a to 130l extend in a substantially anti-clockwise direction, when viewed in plan from the top as shown in FIG. 1a.

The mounting side reinforcement ribs 140a to 140l shown in FIGS. 1b and 1e, on the other hand, show a substantially straight profile, which extends between the inner circumference of the attachment section 120 and their respective second opening 120a to 120l. As shown in more detail in FIG. 1e, the second reinforcement ribs 140a to 140l on the mounting side surface of the mounting hub 100 are, in turn, circumferentially offset from the second openings and extend at an angle to a radial axis of the hub 100 between the inner and outer circumference of the attachment section 120. The second reinforcement ribs 140a to 140l of the first embodiment are inclined relative to a radial direction of the attachment section 120 or hub 100 at an acute angle.

FIG. 1e further shows that the second type of reinforcement ribs 140f to 140k surround the slotted second openings 122f to 122k to absorb braking loads introduced into the first side surface 126f to 126k of the respective second opening 122f to 122k. During a braking event, the braking loads introduced via the mounting screws into the first side surfaces 126f to 126k apply an anti-clockwise force, when viewed from a bottom, mounting side view as in FIGS. 1b and 1e. This anti-clockwise force on the first side surfaces 126f to 126k of the second openings 122f to 122k results in tensioning stresses within the respective reinforcement ribs 140f to 140k. The tensioning forces are distributed by the reinforcement ribs 140a to 140l across the entire mounting hub 100.

It should be understood that the shape of the reinforcement ribs shown in the first embodiment in FIGS. 1a to 1e is not restrictive. For example, the curved profile of the first reinforcement ribs 130a to 130l may be replaced by a straight formation, as will be described in more detail with reference to the second embodiment shown in FIGS. 2a to 2e. Similarly, the second ribs 140a to 140f on the mounting side surface of the hub 100 may, exhibit a curved profile, similar to the non-mounting side reinforcement ribs 130a to 130l of FIG. 1a.

FIGS. 1d and 1e most prominently show that adjacent reinforcement ribs, such as first ribs 130h and 130i or second ribs 140h and 140i define valleys 150h, 160h of reduced thickness therebetween. These so-formed valleys 150g, 150h, 150i, 160f, 160g, 160j, 160i, 160j are areas of reduced stress and can thus be reduced in thickness to save weight. Although not shown in FIG. 1d or 1e, it is feasible to introduce further openings within the valleys 150g to 150i, 160f to 160j, in order to further reduce the weight of the hub 100, if stability requirements allow for such modifications.

The first side surface 126f to 126k of each second opening 122f to 122k is connected to the second side surface 127f to 127k of an adjacent second opening 122f to 122k by a web portion 124g to 124j that exhibits a reduced thickness compared to the side surfaces of the second openings 122a to 122l. In particular, the web portions 124g, 124h, 124i, 124j shown in FIG. 1d are constructed as I-beam structures that extend between the first and second side surfaces of adjacent second openings 122h to 122j. It was found that stresses, which are not absorbed by the reinforcement ribs 130a to 130l and 140a to 140l respectively, mainly act in a circumferential direction of the hub 100 but are not significant in a lateral direction (perpendicular to the plane of projection shown in FIG. 1a). The I-beam construction of the web portions 124g to 124j can thus be introduced to further reduce the weight of the present mounting hub 100.

Figure 2A:
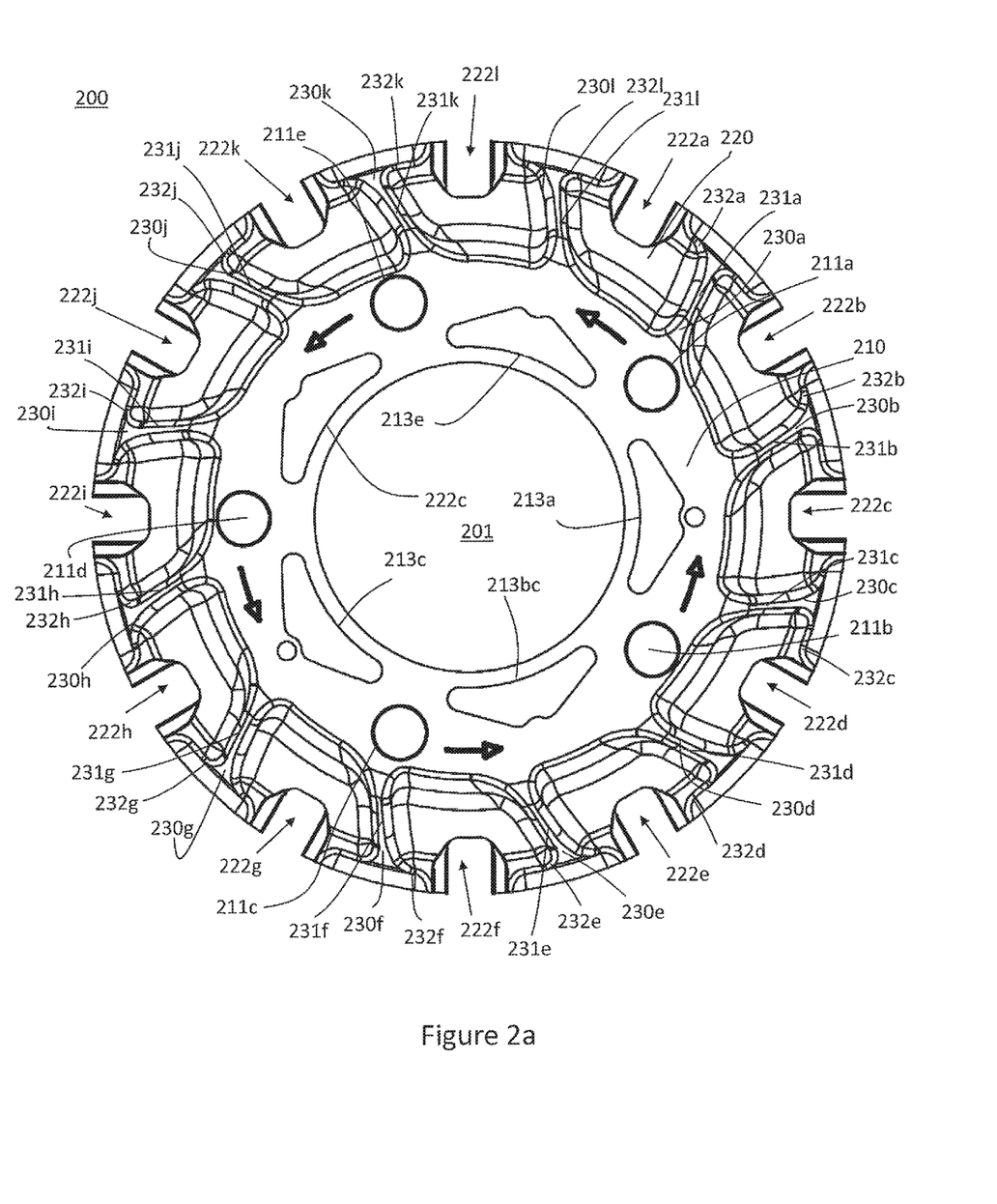
FIG. 2a shows a plan view of a mounting hub according to a second embodiment of the present invention.

FIG. 2a shows a second embodiment of the hub according to the present invention. Parts that are similar to parts of the first embodiment are labelled with corresponding reference signs, increased by "100". As can be derived from FIG. 2a, hub 200 comprises a flange section 210, which is substantially identical to the flange section 110 of the first embodiment. In particular, the flange section 210 comprises five first openings 211a to 211e and five intermediate openings 213a to 213e disposed therebetween. The brake disc attachment section 220 is an annular attachment section with a plurality, that is twelve, second openings 222a to 222l. Each of the second openings 222a to 222l is supported by a corresponding reinforcement rib 230a to 230l.

In contrast to the first embodiment, the reinforcement ribs 230a to 230l on the non-mounting side of the hub 200 shown in FIG. 2a, exhibit a substantially T-shaped profile. As such, the non-mounting side reinforcement ribs 230a to 230l have a substantially straight and inclined stem section 231a to 231l that is connected to side surfaces of adjacent second openings 122a to 122l via a circumferentially extending connector section 232a to 232l. The reinforcement ribs 230a to 230l on the non-mounting side are slightly inclined towards the (anti-clockwise) rotational direction of the mounting hub 200. Accordingly, brake loads that are applied on the first side surfaces 236a to 236l of the second openings 222a to 222l result in a compression of the reinforcement ribs 231a to 231l.

Figure 2B:
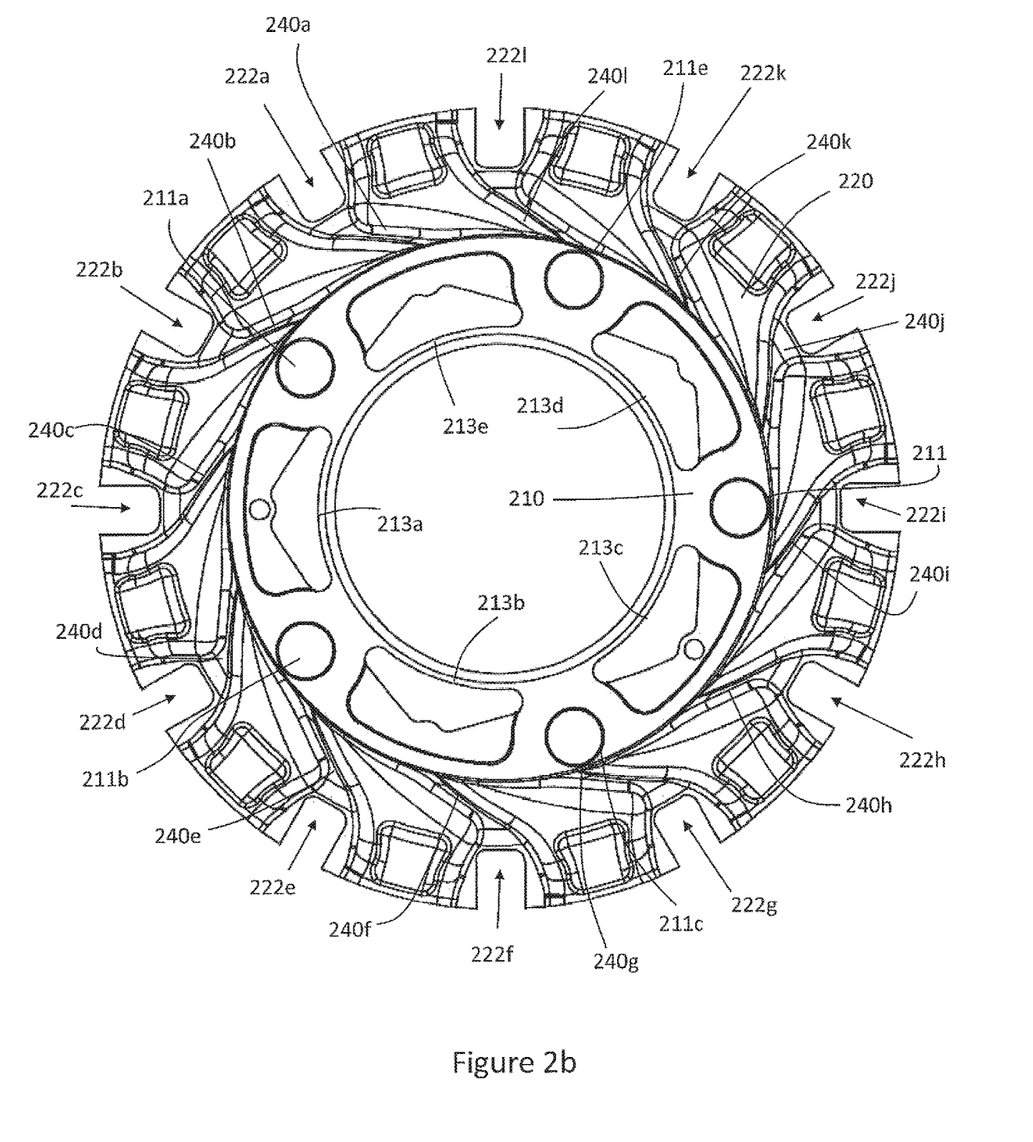
Figure 2C:
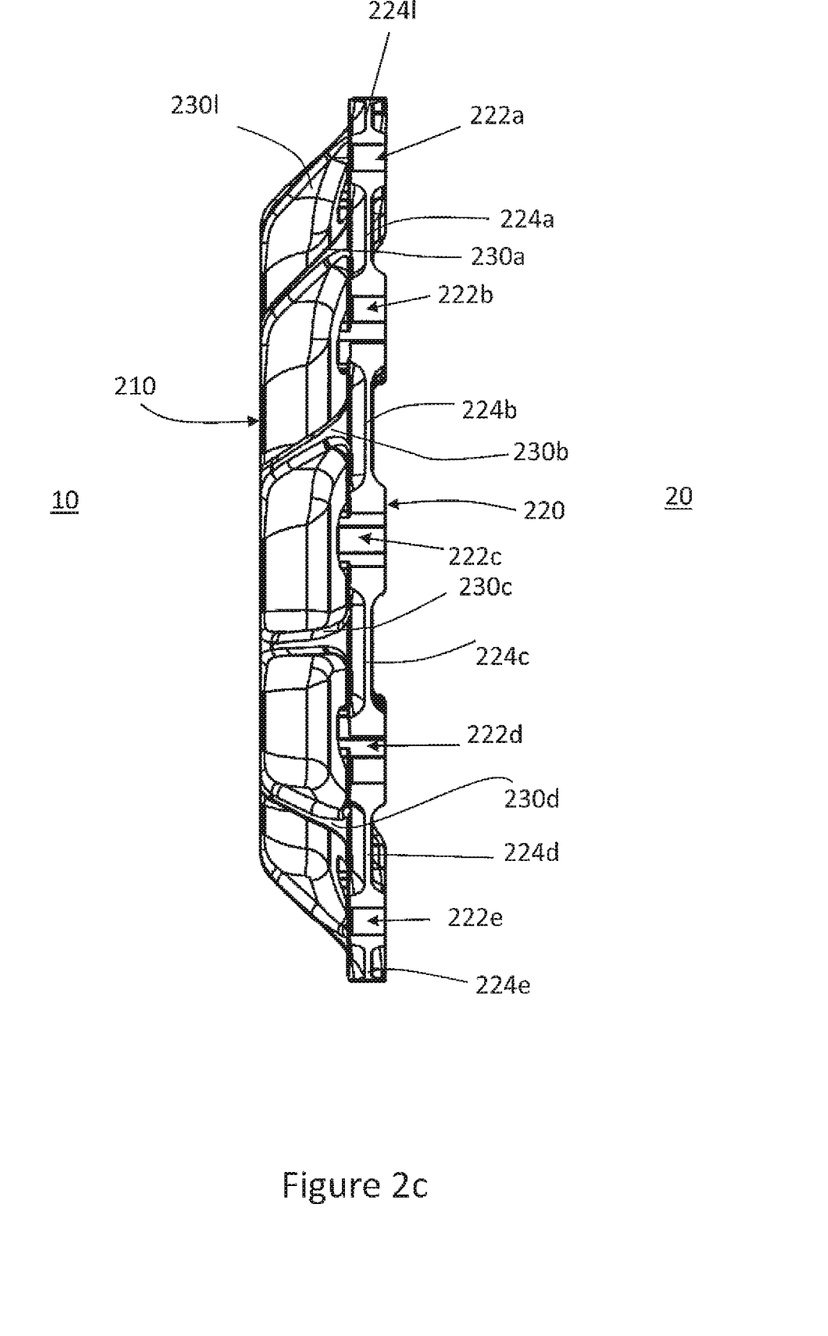
Figure 2D:
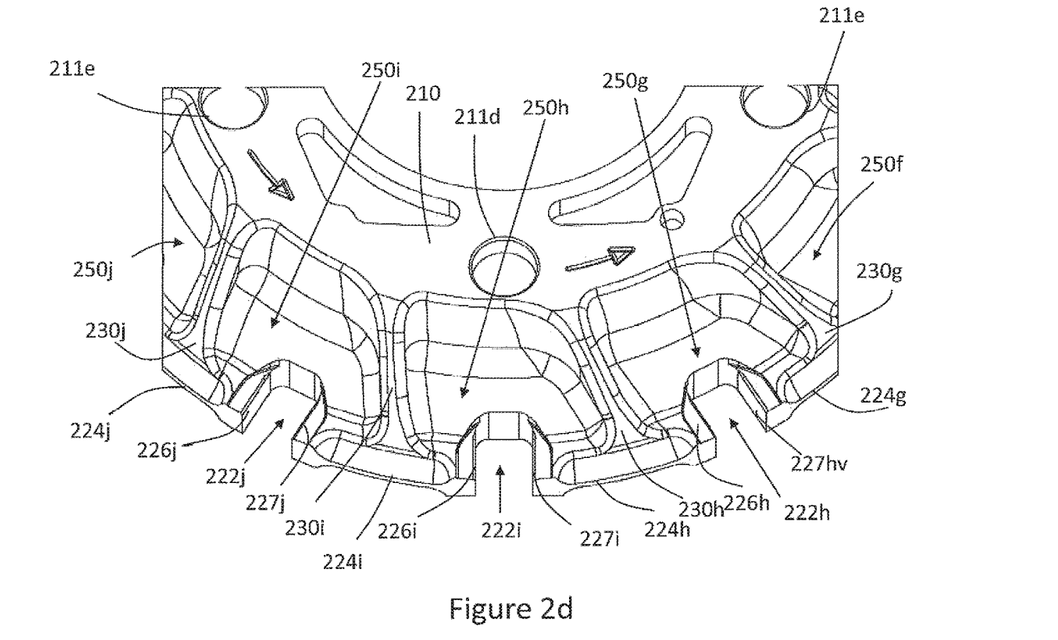

The reinforcement ribs 240a to 240l on the mounting side of the mounting hub 200 are shown in FIG. 2b. The second set of reinforcement ribs 240a to 240l have a similar shape to the second set of reinforcement ribs 140a to 140l according to the first embodiment. In detail, the second set of reinforcement ribs 240a to 240l have a substantially straight shape and are inclined towards an opposite direction to the first set of reinforcement ribs 230a to 230l, that is against the direction of rotation of the mounting hub 200. In other words, the second set of reinforcement ribs 240a to 240l are inclined towards the braking load direction, and thus will be under tension, when braking loads are applied to the first side surface of the second openings 220a to 222l.

Figure 2E:
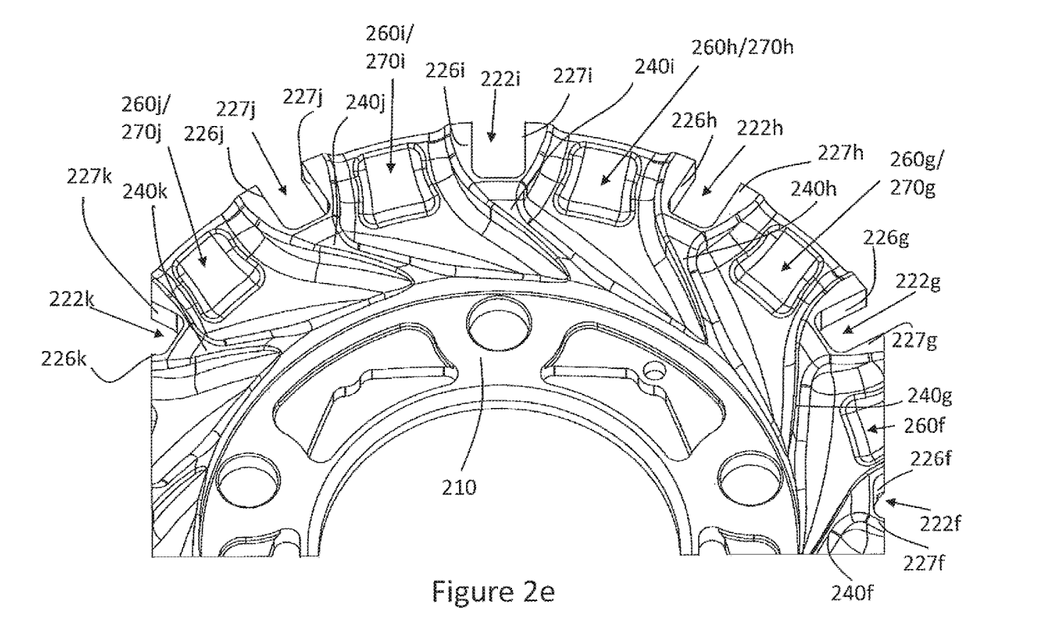
FIG. 2e shows an enlarged perspective view of the right part shown in FIG. 2b.

Similar to the first embodiment, the reinforcement ribs 230a to 230l and 240a to 240l of the second embodiment define valleys 250g, 250h, 250i, 260f, 260g, 260h, 260i, 260j between adjacent reinforcement ribs 230a to 230l, 240a, and 240l. FIG. 2e further shows that the valleys 260f to 260j exhibit substantially square recesses 270f to 270j along the outside circumferential edge of the annular attachment section 220. The recesses 270f to 270j are arranged in sections of the attachment section 220, which are not subject to high stresses during a braking event. Accordingly, the skilled person would understand that the shape and arrangement of the additional recesses 270f to 270j is not limited to the shape and location shown in FIG. 2e. Rather, the recesses could be at any location within the valleys 260f to 260j and comprise any shape that fits the stress paths under braking loads. In some embodiments, the recesses 270f to 270j may be openings that extend through the attachment section 220 of the hub 200.

Figure 3A:
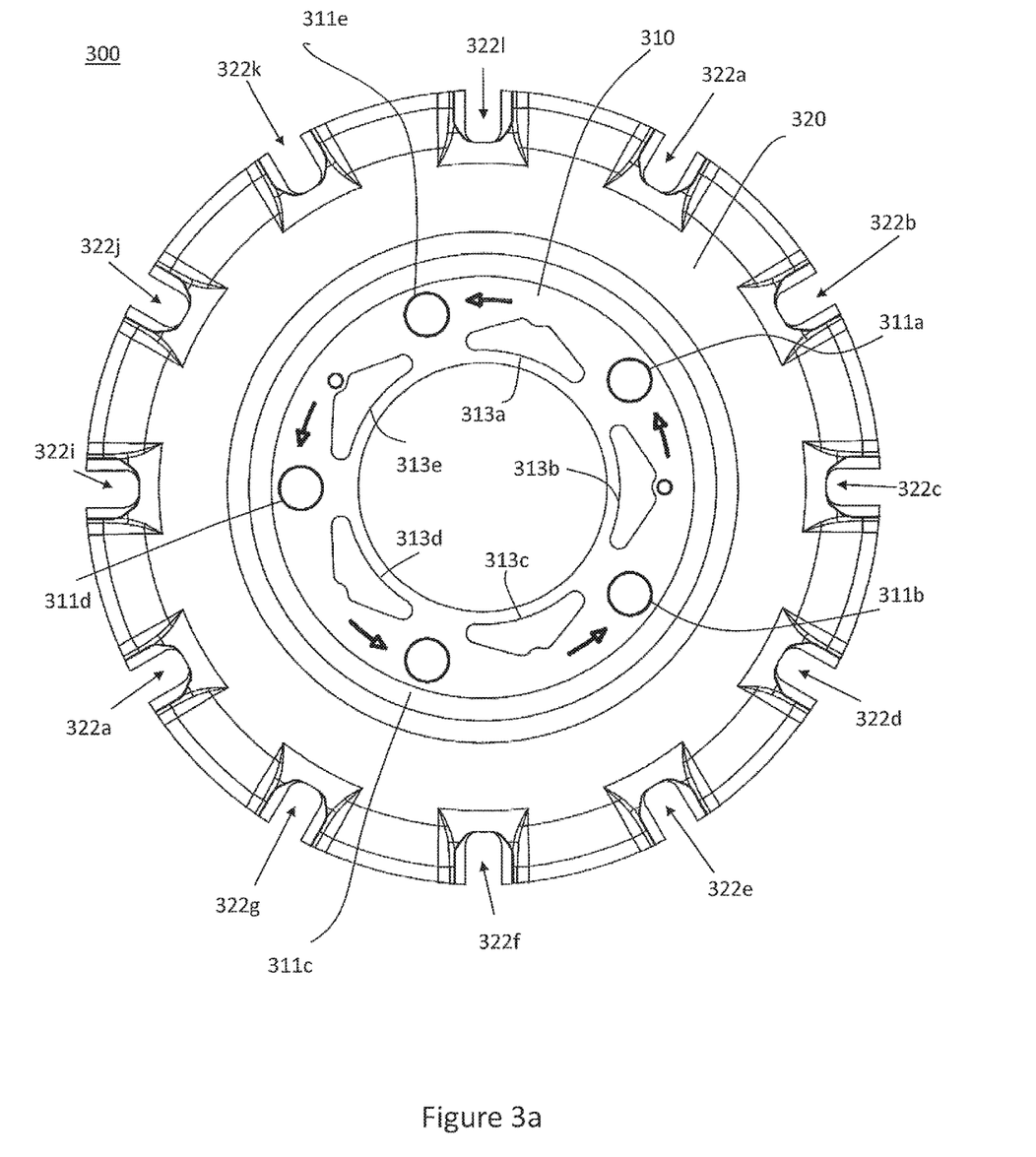
FIG. 3a shows a plan view of a mounting hub according to a third embodiment of the present invention.
Figure 3B:
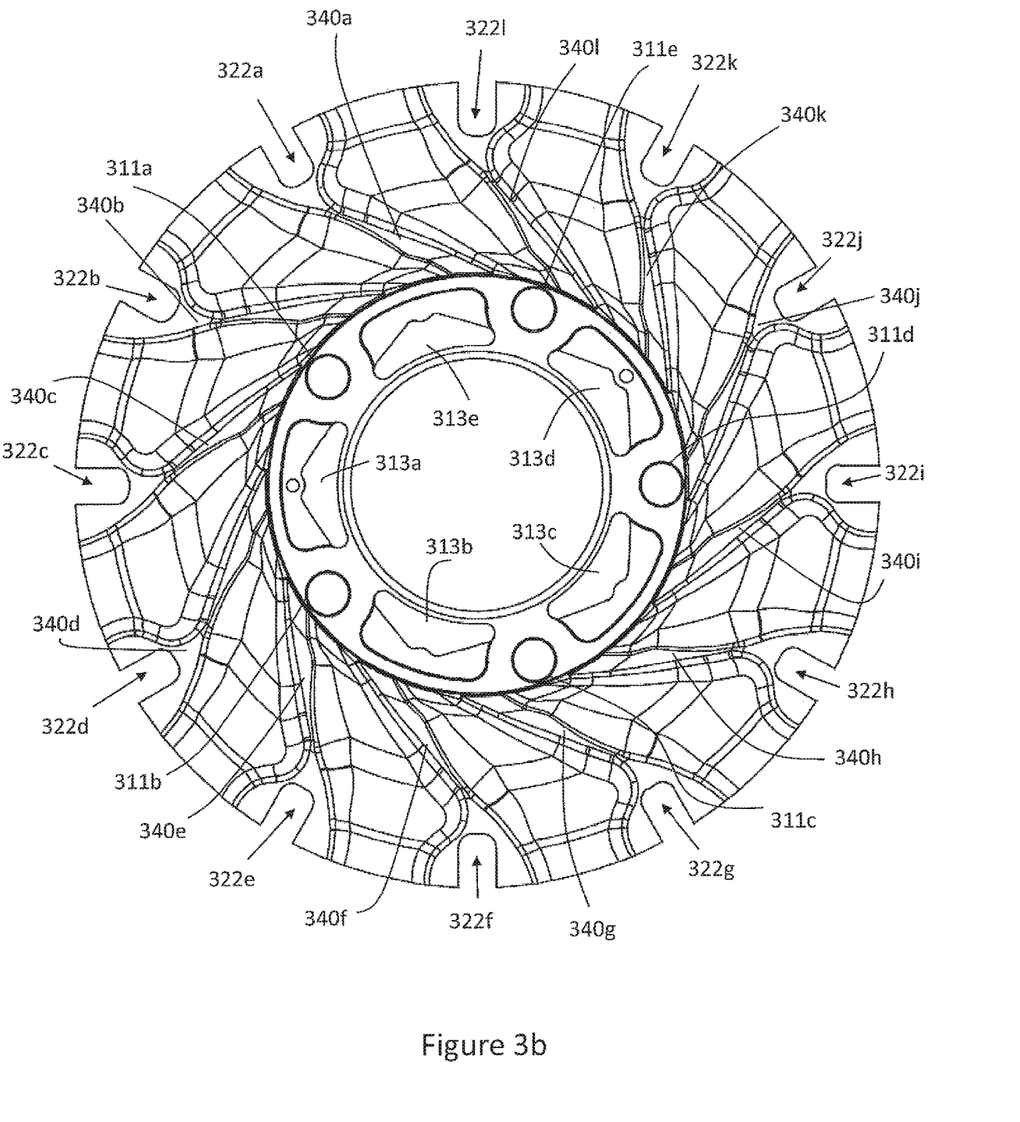
Figure 3C:
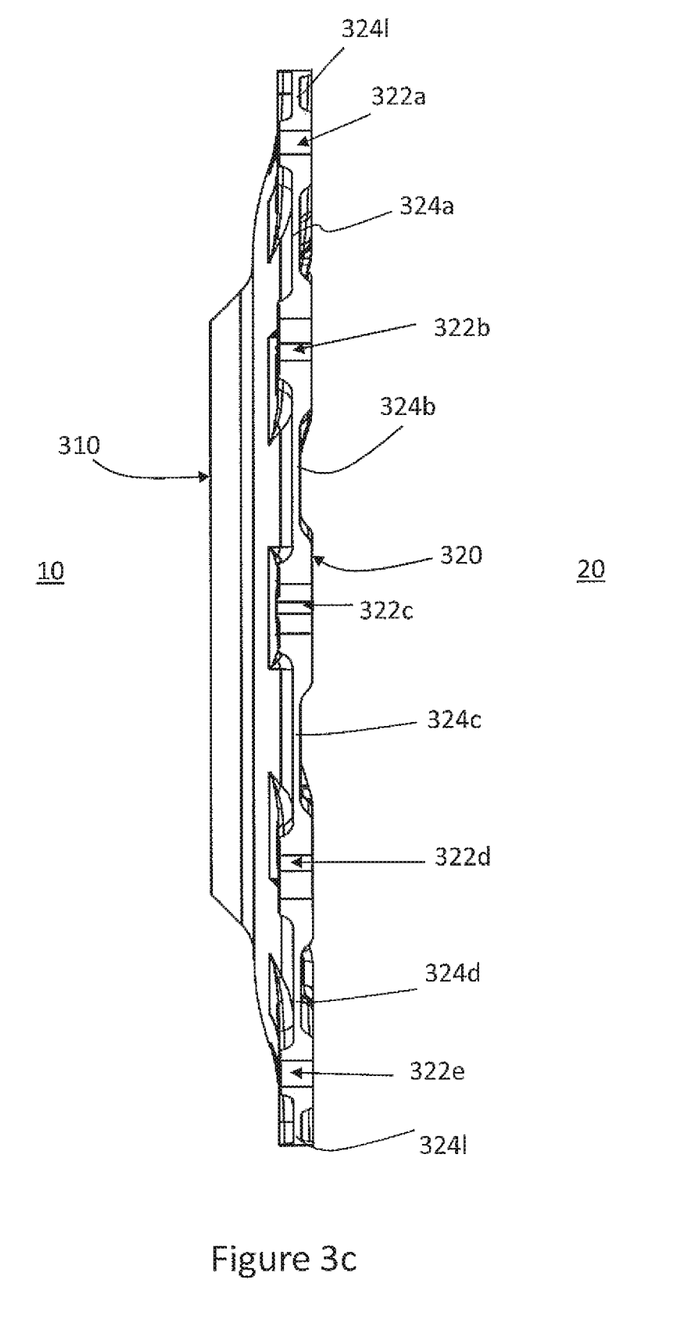
Figure 3D:
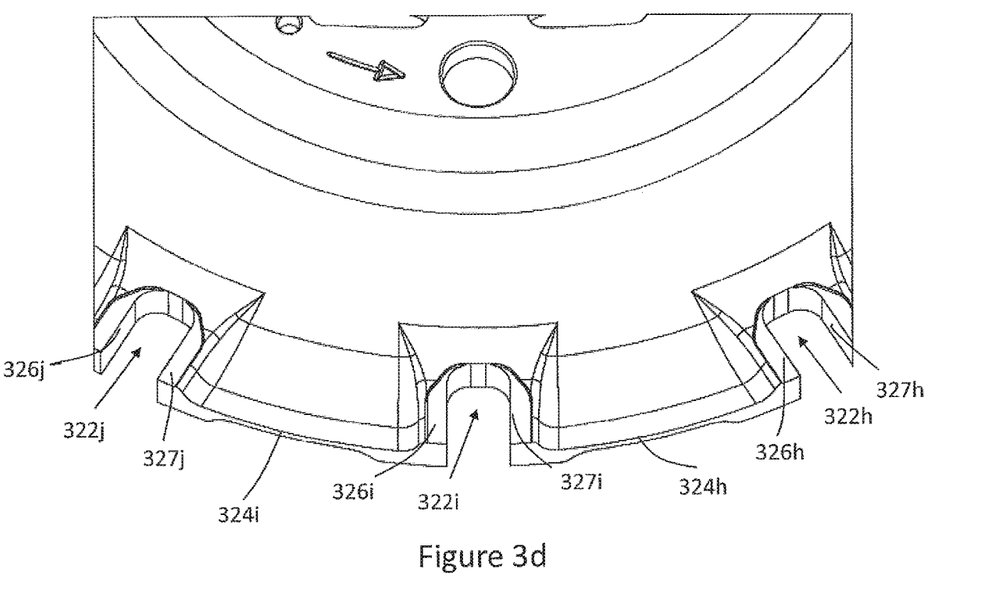
Figure 3E:
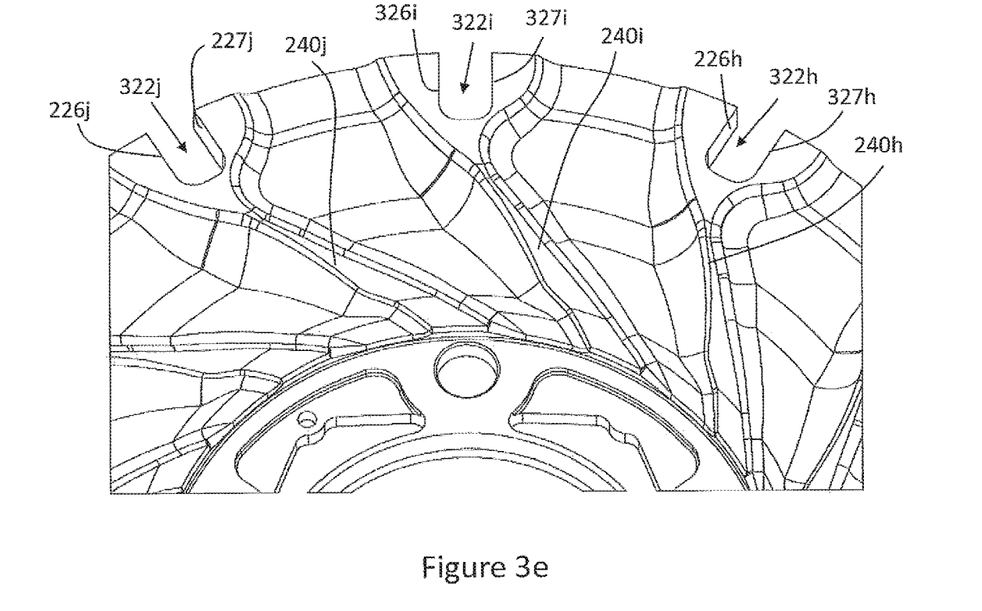
FIG. 3e shows an enlarged perspective view of the right part shown in FIG. 3b.

FIGS. 3a to 3e show a third embodiment of the mounting hub according to the present invention. Parts with a similar function to parts of the first embodiment shown in FIGS. 1a to 1e are labelled with the corresponding reference numbers, plus "200". The mounting hub 300 according to the third embodiment comprises an attachment section 320 which has a substantially larger diameter than the attachment section 120 of the first embodiment. The mounting side of the hub 300, shown in FIG. 3b, has a similar structure as the mounting side of the first embodiment, shown in FIG. 1b. In particular, the mounting side surface of hub 300 again comprises a plurality of reinforcement ribs 340a to 340l extending between the inner circumference and the outer circumference of the attachment section 320. The reinforcement ribs 340a to 340l are inclined against the direction of rotation of the hub 300, and thus adapted to receive tension stresses during braking events. In contrast to the first embodiment, FIG. 3a shows that the hub 300 of the third embodiment does not comprise any reinforcement ribs on the non-mounting side, shown in FIG. 3a. Rather, the non-mounting side surface of the hub 300 comprises a generally smooth surface between the inner and outer circumference of the attachment section 320.

The invention is not restricted to the particular embodiments described with reference to the embodiments shown in the attached illustrations. In particular, the mounting hub may comprise more or fewer first and/or second openings than shown in FIGS. 1a to 3e. Furthermore, additional openings may be arranged within the annular attachment section, particularly between the reinforcement ribs. Finally, reinforcement ribs may only be provided for some but not all of the second openings. For example, there may only be one reinforcement rib for every two, three or four second openings, i.e. a total of six, four or three instead of twelve reinforcement ribs.

The invention claimed is:

1. A hub for mounting to a brake disc and to a flange member on a vehicle axis, the hub comprising:
   a flange section comprising a plurality of first openings adapted to receive first mounting members for mounting the flange section to the flange member;
   a brake disc attachment section connected to the flange section, said brake disc attachment section circumferentially surrounding the flange section and comprising a plurality of second openings arranged along an outside circumference of the attachment section, wherein the plurality of second openings are adapted to receive second mounting members for mounting the attachment section to the brake disc,
   wherein each of the second openings in the plurality of second openings comprises a first side surface and a second side surface opposite the first side surface, wherein the first side surface is a load bearing surface adapted to bear a braking load introduced by the second mounting members received in the second openings, when in use, and wherein the attachment section comprises a plurality of reinforcement ribs directly connected to the first side surfaces of the second openings of the plurality of second openings, wherein each reinforcement rib of the plurality of reinforcement ribs includes a first end, a second end, and a stem extending between the first and second ends, wherein each stem is a portion of the attachment section with increased thickness in an axial direction relative to other portions defining valleys of reduced thickness between adjacent reinforcement ribs of the plurality of reinforcement ribs, wherein each stem is narrower in a circumferential direction compared to the valleys, and wherein the second ends are offset from the first ends in a radial direction and the circumferential direction such that each reinforcement rib of the plurality of reinforcement ribs is inclined relative to the radial direction along the circumferential direction.

2. The hub of claim 1, wherein the at least one reinforcement rib extends between an inside circumference and the outside circumference of the attachment section.

3. The hub of claim 1, wherein the attachment section comprises at least one reinforcement rib for each of the second openings.

4. The hub of claim 3, wherein each of the reinforcement ribs is connected to one of the plurality of second openings.

5. The hub of claim 1, wherein the attachment section comprises a mounting side surface for contacting the brake disc, in use, and a non-mounting side surface opposite the mounting side surface, wherein the at least one reinforcement rib is arranged on the mounting side surface of the attachment section.

6. The hub of claim 5, wherein the mounting side reinforcement rib of the attachment section comprises a substantially straight profile.

7. The hub of claim 5, wherein the attachment section further comprises at least one reinforcement rib arranged on the non-mounting side surface of the attachment section, wherein the at least one non-mounting side reinforcement rib of the attachment section comprises a substantially curved profile.

8. The hub of claim 7, wherein the at least one reinforcement rib arranged on the mounting side of the attachment section extends in a different direction to the at least one non-mounting side reinforcement rib, when viewed in plan.

9. The hub of claim 7, wherein the reinforcement rib arranged on the mounting side of the attachment section is offset in relation to the non-mounting side reinforcement rib, when viewed in plan.

10. The hub of claim 1, wherein the attachment section comprises a mounting side surface for contacting the brake disc, in use, and a non-mounting side surface opposite the mounting side surface, wherein the at least one reinforcement rib is arranged on the non-mounting side surface of the attachment section.

11. The hub of claim 5, wherein the mounting side surface of the attachment section is asymmetrical to the non-mounting side surface.

12. The hub of claim 5, wherein the reinforcement rib on the mounting side surface of the attachment section is inclined at an acute angle relative the radial direction of the attachment section, and/or wherein the reinforcement rib on the non-mounting side surface of the attachment section is inclined at an acute angle relative the radial direction of the attachment section.

13. The hub of claim 1, wherein the attachment section comprises at least one opening located within one of said valleys.

14. The hub of claim 1, wherein the plurality of second openings are slots extending radially inwards from the outside circumference of the attachment section.

15. The hub of claim 1, wherein the first side surface of each second opening is connected to the second side surface of an adjacent second opening by means of a web portion.

16. The hub of claim 1, wherein the plurality of second openings are holes adapted to retain the mounting members in a non-floating manner.

17. A hub for mounting to a brake disc and to a flange member on a vehicle axis, the hub comprising:
a flange section comprising a plurality of first openings adapted to receive mounting members for mounting the flange section to the flange member;
a brake disc attachment section connected to the flange section, said brake disc attachment section circumferentially surrounding the flange section and comprising a plurality of second openings arranged along an outside circumference of the attachment section, wherein the plurality of second openings are adapted to receive screws for mounting the attachment section to the brake disc,
wherein each of the second openings in the plurality of second openings is a slot comprising a first side surface and a second side surface opposite the first side surface, wherein the first side surface is a load bearing surface adapted to bear a braking load introduced by the screws received in the second openings, when in use, and wherein the attachment section comprises at least one reinforcement rib directly connected to the first side surface of at least one of the second openings of the plurality of second openings, and
wherein the at least one reinforcement rib is a portion of the attachment section with increased thickness in an axial direction relative to other portions defining valleys of reduced thickness between adjacent reinforcement ribs of the plurality of reinforcement ribs.

18. A hub for mounting to a brake disc and to a flange member on a vehicle axis for rotation in a direction of rotation, the hub comprising:
a flange section comprising a plurality of first openings adapted to receive first mounting members for mounting the flange section to the flange member;
a brake disc attachment section connected to the flange section, said brake disc attachment section circumferentially surrounding the flange section and comprising a plurality of second openings arranged along an outside circumference of the attachment section, wherein the plurality of second openings are adapted to receive second mounting members for mounting the attachment section to the brake disc,
wherein each of the second openings in the plurality of second openings comprises a first side surface and a second side surface opposite the first side surface, wherein the first side surface is a load bearing surface adapted to bear a braking load introduced by the second mounting members received in the second openings, when in use, and wherein the attachment section comprises a plurality of reinforcement ribs directly connected to the first side surfaces of the second openings of the plurality of second openings,
wherein each stem is a portion of the attachment section with increased thickness in an axial direction relative to other portions defining valleys of reduced thickness between adjacent reinforcement ribs of the plurality of reinforcement ribs,
wherein each stem is narrower in the direction of rotation compared to the valleys, and wherein each reinforcement rib is inclined relative to a radial direction of the attachment section toward or away from the direction of rotation.

19. The hub of claim 18, wherein the attachment section comprises a mounting side surface for contacting the brake disc, in use, and a non-mounting side surface opposite the mounting side surface, and wherein the plurality of reinforcement ribs includes a first plurality or reinforcement ribs arranged along the mounting side surface and inclined away from the direction of rotation and a second plurality or reinforcement ribs arranged along the non-mounting side surface and inclined toward the direction of rotation.

\* \* \* \* \*